United States Patent [19]

Sato

[11] Patent Number: 4,668,022
[45] Date of Patent: May 26, 1987

[54] ANTI-LOCK BRAKING SYSTEM

[75] Inventor: Makoto Sato, Kamifukuoka, Japan

[73] Assignee: Honda Giken Kogyo Kabushiki Kaisha, Tokyo, Japan

[21] Appl. No.: 739,267

[22] Filed: May 29, 1985

[30] Foreign Application Priority Data

May 31, 1984 [JP] Japan .................. 59-112081
May 31, 1984 [JP] Japan .................. 59-112083

[51] Int. Cl.$^4$ .............................................. B60T 8/82
[52] U.S. Cl. ...................................... 303/100; 303/96; 303/106
[58] Field of Search ............... 303/100, 92, 96, 97, 303/95, 103, 105, 106, 107, 110; 188/181 A, 181 R

[56] References Cited

U.S. PATENT DOCUMENTS 3,727,992 4/1973 Bowler et al. ................. 303/107
3,843,207 10/1974 Syria ............................. 303/97

FOREIGN PATENT DOCUMENTS

1603459 11/1981 United Kingdom ............ 303/106

Primary Examiner—John W. Caldwell, Sr.
Assistant Examiner—Alvin Oberley
Attorney, Agent, or Firm—Armstrong, Nikaido, Marmelstein & Kubovcik

[57] ABSTRACT

An anti-lock braking system having a wheel brake, a hydraulic control circuit for controlling the supply of a hydraulic control pressure to the wheel brake, and an electronic control circuit for energizing the hydraulic control circuit so as to reduce the hydraulic braking pressure applied to the wheel brake when the wheel is about to be locked due to the rotational speed characteristics thereof, characterized in that the electronic control circuit has the function of detecting the condition of a road surface on which a vehicle runs, and is formed in such a manner that, when the electronic control circuit judges that the road surface is rough, it is operated so that it employs the highest wheel speed of the two wheel speed signals, and when the road surface is judged not to be rough respective wheel speed signals are employed by the electronic control circuit for operation of their respective hydraulic control circuits. The electronic control circuit is adapted to judge that, when the fluctuating frequency of a wheel speed is not less than a predetermined level, the road surface on which the vehicle runs is rough.

3 Claims, 7 Drawing Figures

ANTI-LOCK BRAKING SYSTEM

BACKGROUND OF THE INVENTION

1. Field of the Invention

This invention relates to an anti-lock braking system including a wheel brake, a hydraulic control circuit for controlling the supply of a hydraulic braking pressure to the wheel brake, and a control means for determining whether a wheel is likely to be locked, on the basis of the rotational characteristics thereof, and for making operative the hydraulic control circuit when the wheel is about to be locked, so as to reduce the hydraulic braking pressure supplied to the wheel brake.

2. Description of the Prior Art

When a braking operation is carried out while a vehicle provided with a conventional anti-lock braking system runs on a rough road, the braking force applied to the wheel varies due to the variations in the ground-contacting conditions thereof even if the hydraulic braking pressure is constant. Consequently, the suspension of the vehicle is vibrated longitudinally. This causes the vehicle speed to pulsate in some cases. When such a pulsation of the vehicle speed occurs, the control means judges erroneously that there is the possibility that the wheel is locked, even when there is no such a possibility in practice. As a result, the hydraulic control circuit is energized so as to reduce the hydraulic braking pressure, so that the braking distance increases in some cases.

SUMMARY OF THE INVENTION

A first object of the present invention is to provide an anti-lock braking system capable of preventing a braking distance from increasing while the vehicle runs on a rough road.

In order to achieve this object, in a first aspect of the present invention, the control means is constructed so that it has the functions of detecting the condition of the road surface on which the vehicle runs, and reducing the rate of decrease in the hydraulic braking pressure when this means judges that the condition of the road surface is bad.

A second object of the present invention is to provide an anti-lock braking system capable of detecting a bad condition of the road surface easily, and preventing the braking distance from increasing while the vehicle runs on the bad road surface.

In order to achieve this object, in a second aspect of the present invention, the control means is constructed so that it has the functions of judging the road surface, on which the vehicle runs, to be bad when the fluctuation frequency of the vehicle speed is not lower than a predetermined level, and so that the control means works so as to reduce the rate of decrease in the hydraulic braking pressure when the road surface is judged to be in a bad condition.

Owing to the specified constructions as mentioned above, an unnecessary reduction of the hydraulic braking pressure can be prevented even if the control means judges erroneously that the wheel is about to be locked due to the variations in the ground-contacting condition of the wheel running on a rough road surface, whereby the braking efficiency does not decrease while the vehicle runs on a rough road.

The present invention is capable of detecting automatically with ease a signal indicating that the wheel of the vehicle is running on a rough road surface.

The above and other objects as well as advantageous features of the invention will become apparent from the following description of the preferred embodiments taken in conjunction with the accompanying drawings.

BRIEF DESCRIPTION OF THE DRAWINGS

FIGS. 1-5 show a first embodiment of the present invention, wherein:

DESCRIPTION OF THE PREFERRED EMBODIMENTS

Figure 1:
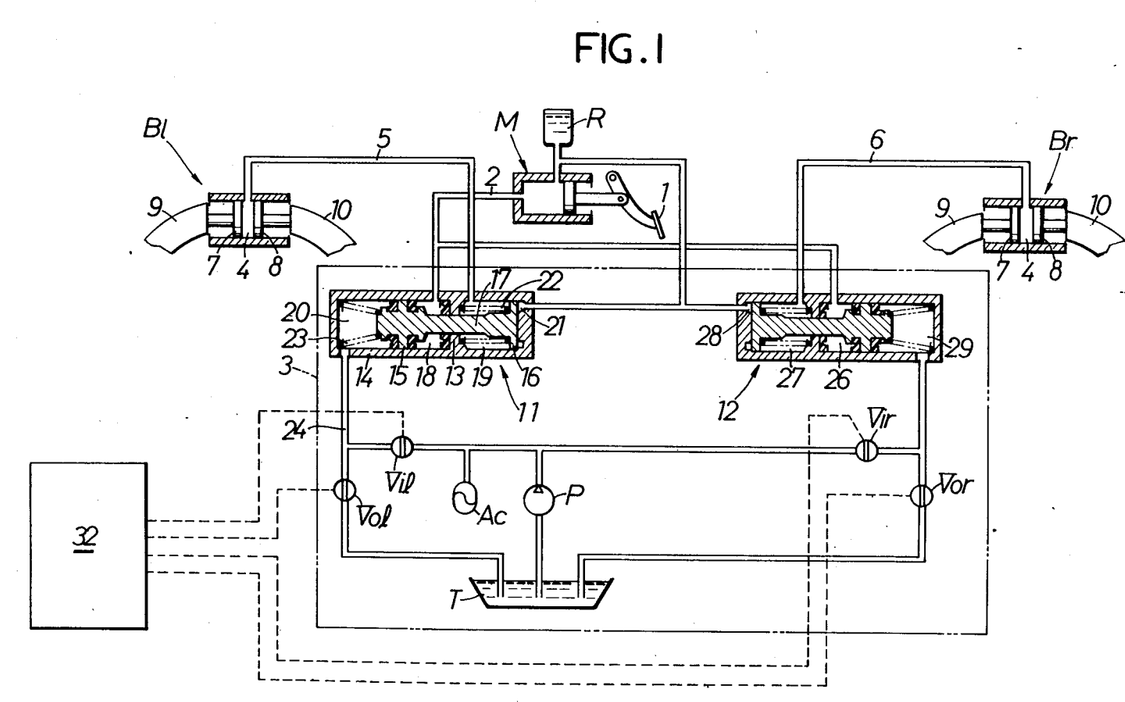
FIG. 1 is a diagram of a hydraulic control circuit.

The embodiments of the present invention will now be described with reference to the drawings. First, referring to FIG. 1 showing a first embodiment of the present invention, a brake pedal 1 is operatively connected to a master cylinder M. When a driver steps on this brake pedal 1, the master cylinder M generates a hydraulic pressure in an oil passage 2. This oil passage 2 is connected to a hydraulic control circuit 3. A hydraulic braking pressure in accordance with the hydraulic pressure in the oil passage 2 is outputted from the hydraulic control circuit 3.

Wheel brakes are attached to the left and right front wheels and left and right rear wheels of a vehicle. The hydraulic braking pressure is supplied from the hydraulic control circuits 3 to these wheel brakes. The construction of the wheel brakes attached to these left and right front wheels and left and right rear wheels, and the construction of the hydraulic control circuits 3 for supplying a hydraulic braking pressure to the wheel brakes are basically identical to one another. Therefore, only the wheel brake Bl for the left rear wheel and the wheel brake Br for the right rear wheel, and the hydraulic control circuit 3 which is associated with these brakes Bl, Br will now be described.

Oil passages 5, 6 extending from the hydraulic control circuit 3 communicate with the hydraulic braking pressure chambers 4 for the wheel brakes Bl, Br. When a hydraulic braking pressure is supplied to each braking pressure chamber 4, pistons 7, 8 are moved away from each other, so that brake shoes 9, 10 come into contact with a brake drum (not shown), respectively, to generate a braking torque.

When the hydraulic braking pressure in the hydraulic braking pressure chamber 4 is too high, the braking torque generated between the brake shoes and brake drum becomes too high, so that the wheels are locked. In order to prevent this, when the wheels are about to be locked, the hydraulic braking pressure is reduced by the hydraulic control circuit 3, so that the locking of the wheels does not occur.

The hydraulic control circuit 3 is provided with modulators 11, 12 corresponding to the wheel brakes Bl, Br. Since these modulators 11, 12 have the basically same construction, the construction of one modulator 11 alone will be described in detail. The modulator 11 is provided with a cylinder 14 closed at both ends thereof and having a partition 13 at an intermediate portion of the interior thereof, and a rod 17 having pistons 15, 16 at both ends thereof and penetrating through the partition 13 axially and slidably at the portion thereof which is between the pistons 15, 16. The portion of the interior of the cylinder 14 which is between the partition 13 and one piston 15 is formed as a primary hydraulic braking pressure chamber 18, which communicates with the master cylinder M via oil passage 2. The portion of the interior of the cylinder 14 which is between the partition 13 and the other piston 16 is formed as secondary hydraulic braking pressure chamber 19, which communicates with the hydraulic braking pressure chamber 4 for the wheel brake Bl via the oil passage 5. An anti-lock hydraulic control chamber 20 is formed between one end wall of the cylinder 14 and the piston 15, and a hydraulic discharge chamber 21 between the other end wall of the cylinder 14 and the other piston 16, the hydraulic discharge chamber 21 communicating with a reservoir R in the master cylinder M. A spring 22 urging the piston 16 away from the partition 13 is provided in the secondary hydraulic braking pressure chamber 19, and a spring 23 urging the piston 15 toward the partition 13 is provided in the anti-lock hydraulic control chamber 20.

An oil passage 24 is connected to the anti-lock hydraulic control chamber 20. This oil passage 24 is also connected to a hydraulic pump P via a normally-closed inlet valve Vil, and to an oil tank T via a normally-opened outlet valve Vol. An accumulator Ac is connected between the inlet valve Vil and hydraulic pump P.

Also, in the other modulator 12, a primary hydraulic braking pressure chamber 26 communicates with the master cylinder M, a secondary hydraulic braking pressure chamber 27 with the wheel brake Br via passage 6, and a hydraulic discharge chamber 28 with the reservoir R. An anti-lock hydraulic control chamber 29 is connected to the hydraulic pump P via a normally-closed inlet valve Vir, and to the oil tank T via a normally-opened outlet valve Vor.

The inlet valves Vil, Vir and outlet valves Vol, Vor are solenoid valves, the opening and closing of them are controlled by a control means 32.

When the inlet valves Vil, Vir are closed with the outlet valves Vol, Vor opened, the anti-lock hydraulic control chambers 20, 29 are in communication with the oil tank T. When the brake pedal 1 is stepped to supply a hydraulic pressure from the master cylinder M to the primary hydraulic braking pressure chambers 18, 26, the volumes of the secondary hydraulic braking pressure chambers 19, 27 decrease, and a hydraulic braking pressure corresponding to the hydraulic pressure fed from the master cylinder M is supplied to the hydraulic braking pressure chambers 4 in the wheel brakes Bl, Br. Accordingly, the braking torque increases freely in conformity with the driver's braking operation.

When the outlet valves Vol, Vor are closed with the inlet valves Vil, Vir closed, the control oil in the anti-lock hydraulic control chambers 20, 29 is trapped therein. Consequently, the volumes of the secondary hydraulic braking pressure chambers 19, 27 are invariable whether or not the hydraulic pressure supplied to the primary hydraulic braking pressure chambers 18, 26 increases or decreases. Hence, the braking torque during braking operation is maintained at a predetermined level irrespective of the driver's braking operation. Such operational condition occurs when there is the possibility that the wheels are locked.

When the inlet valves Vil, Vir are opened with the outlet valves Vol, Vor closed, the anti-lock hydraulic control pressure is supplied to the anti-lock hydraulic pressure chambers 20, 29. Therefore, the volumes of the secondary hydraulic braking pressure chambers 19, 27 increase in spite of the fact that the hydraulic pressure from the master cylinder M is applied to the primary hydraulic braking pressure chambers 18, 26, whereby the hydraulic pressure in the braking oil chambers 4 in the wheel brakes Bl, Br decreases to lower the braking torque. Accordingly, if the inlet valves Vil, Vir are opened with the outlet valves Vol, Vor closed when the wheels are about to be locked, the locking of the wheels can be prevented.

The construction of a control means 32 will now be described with reference to FIG. 2. Since the construction for controlling the inlet valve Vil and outlet valve Vol which correspond to one wheel brake Bl, and that for controlling the inlet valve Vir and outlet valve Vor which correspond to the other wheel brake Br are basically identical, only the former construction will be described.

The control means 32 is provided with a judgement circuit 33 consisting of a microcomputer, for example, and adapted to determine whether the wheels are locked or not. The judgement circuit outputs on the basis of this determination a signal for opening or closing the inlet valve Vil and outlet valve Vol.

The conditions constituting a judgement basis for determining to output a signal for carrying out an anti-lock control operation will now be discussed. In general, the following four systems (a)–(d) have been proposed.

(a) A system in which a signal $\beta$ is outputted when the formula, wheel acceleration $\dot{V}w<$ reference wheel deceleration $-\dot{V}w_0$, is established, to lessen the braking pressure.

(b) A system in which a signal $S_1$ is outputted when the formula, wheel speed $Vw<$ first reference wheel speed $Vr_1$, is established, to lessen the hydraulic braking pressure. In this case, $Vr_1 = Vv \cdot (1-\lambda_1)$, wherein Vv is a vehicle speed; and $\lambda_1$ a suitable slip ratio of the wheel. Therefore, if the slip ratio is expressed by $\lambda$, $Vw<Vr_1$ has the same meaning as $\lambda > \lambda_1$, and, when $Vw<Vr_1$ or $\lambda > \lambda_1$ is established, the signal $S_1$ is outputted.

(c) A system in which the hydraulic braking pressure is lessened when either (a) or (b) above is established.

(d) A system in which the hydraulic braking pressure is lessened when (a) and (b) above is established concurrently.

In the system (a) above, the reference wheel deceleration $-\dot{V}w_0$ is set to a level, usually, for example, $-2.0 \sim 1.2$ G, which are not obtained during a braking operation carried out when there is no possibility that the locking of the wheels occurs. However, according to this system, a wheel deceleration of around $-1.0 \sim -0.5$ G occurs in some cases during a braking operation carried out on a snow-covered road or a frozen road, and a signal for lessening the hydraulic braking pressure is not outputted in spite of the fact that the wheels are locked in the latter part of a braking operation. While the vehicle runs on a rough road, the wheel acceleration $\dot{V}w$ pulsates finely even druing a regular braking operation, and a signal $\beta$ is outputted even when there is no possibility that the wheels are locked, to cause the braking efficiency to decrease.

In the system (b), when the wheel speed Vw is increasing, it is judged that the hydraulic braking pressure has been lessened sufficiently even if the slip ratio $\lambda$ is high, i.e., even if the signal $S_1$ is outputted. The hydraulic braking pressure is necessarily lessened during this time as well, so that the braking efficiency decreases.

It is clear that the system (c) has the faults of the systems (a) and (b).

Finally, in the system (d), the problem of a decrease in the braking efficiency during the driving on a rough road, and the problem of a decrease in the braking efficiency due to a hydraulic braking pressure-lessening operation carried out while the wheel speed Vw increases are solved. Furthermore, if the reference wheel deceleration $-\dot{V}w_0$ is set in the level in the range of wheel deceleration occurring during a braking operation carried out while the vehicle runs on a regular road surface, for example, $-1.0 \sim 0$ G, and preferably $-0.3 \sim -0.6$ G, the locked wheels can be detected even when the wheel deceleration is $-1.0 \sim -0.5$ G in a braking operation carried out on a snow-covered road or a frozen road, and the hydraulic braking pressure can thereby be lessened.

In the judgement circuit 33, a signal corresponding to a wheel speed Vw is inputted from the vehicle speed detector 34, and this wheel speed Vw and a wheel acceleration $\dot{V}w$, which is computed on the basis of the wheel speed Vw, are compared with a first reference wheel speed Vr, and a reference wheel deceleration $-\dot{V}w_0$, respectively. When $\dot{V}w < -\dot{V}w_0$ and $Vw < Vr_1$ are established, high-level signals $\beta$, $S_1$ are outputted from the judgement circuit 33. These signals $\beta$, $S_1$ are inputted into an AND-gate 35, and, when both of these signals are in high levels, a transistor 36 is turned on, and a solenoid 38 is excited, the inlet valve Vil being opened. When a high-level signal $S_1$ is outputted, a transistor 37 is turned on, and a solenoid 39 is excited, the outlet valve Vol being closed.

When the braking torque starts being reduced by the signals $\beta$, $S_1$ as mentioned above, the vehicle speed is still decreasing. At this time, the braking torque is still higher than the driving torque on the road surface, and the possibility of locking of the wheels has not yet been completely removed. However, the system generally has an operational delay of around 10 ms. Accordingly, the hydraulic braking force is further lessened after the braking pressure-lessening signal has been extinguished, so that this system generally enables a good effect to be obtained. However, in some cases, the braking pressure is not lessened sufficiently under certain conditions of the road surface to cause the wheel speed to vary in the locking direction. In order to prevent such a phenomenon, a braking pressure-lessening signal may be generated, when $\lambda > \lambda_1$, until the wheel speed Vw has started increasing certainly. However, in spite of the fact that a control operation can usually be carried out satisfactorily even when the generation of the braking pressure-lessening signal is stopped upon the establishment of $\dot{V}w > -\dot{V}w_0$, this signal is retained until $\dot{V}w > 0$ has been attained. This causes the braking torque to be lessened excessively. However, this poses no problems in practice in the wheels having a small braking load distribution.

A second reference wheel speed $Vr_2$ which corresponds to a second reference slip ratio, at which $\lambda_2 > \lambda_1$ is now set. Only when $Vw < Vr_2$, i.e. $\lambda > \lambda_2$, so that the possibility that the wheels are locked has increased, the braking pressure-lessening signal is retained until the vehicle speed Vw has started increasing. In the judgement circuit 33, it is judged whether or not $Vw < Vr_2$ or $\lambda > \lambda_2$, and, when the conditions are satisfied, a signal $S_2$ is outputted. In order to judge that the wheel speed Vw is increasing, a speedup reference value $+\dot{V}w_0$ is set, and, when $\dot{V}w > +\dot{V}w_0$, a signal $\alpha$ is outputted.

The signal $S_2$ is inputted into one input terminal of an AND-gate 40 and an OR-gate 41. The signal $\alpha$ is inputted into the OR-gate 41, and inverted and inputted into the AND-gate 40. The signal $S_1$ is also inputted into the OR-gate 41, and an output from the OR-gate 41 is applied to the base of transistor 37. Outputs from both AND-gates 35, 40 are inputted into OR-gate 42 which in turn feeds an output to the base of transistor 36.

According to the control means 32, the level of any one of the signals $S_1$, $\alpha$, $S_2$ has become high, the transistor 37 is turned on, the outlet valve Vol is closed, and when the levels of both of the signals $\beta$, $S_1$ are high, or when the level of the signal $S_2$ is high with that of the signal $\alpha$ low, the inlet valve Vil is opened.

A method of setting first and second reference wheel speeds $Vr_1$, $Vr_2$ will now be described. These wheel speeds are determined ideally by detecting a vehicle speed Vv, and making calculations in accordance with the following formulae taking suitable reference slip ratios $\lambda_1$, $\lambda_2$ into consideration.

$$Vr_1 = Vv(1-\lambda_1)$$

$$Vr_2 = Vv(1-\lambda_2)$$

However, no practical means for detecting a vehicle speed Vv has been found out up to the present time. Therefore, a system for estimating a tentative vehicle speed Vr on the basis of the condition of variations in the wheel speed Vw is generally used. A basic circuit of this system is shown in FIG. 3.

Figure 3:
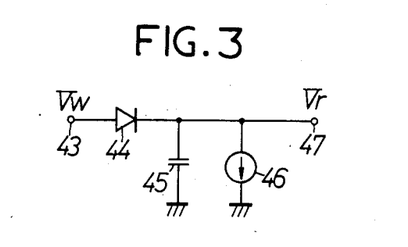
FIG. 3 is a diagram of an electric circuit for use in estimating a vehicle speed.
Figure 4:
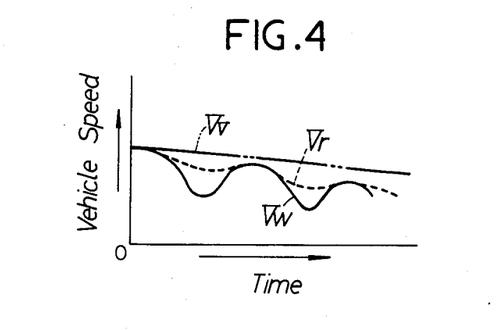
FIG. 4 is a diagram showing the operational characteristics of the electric circuit of FIG. 3.

Referring to FIG. 3, a wheel speed Vw is inputted into an input terminal 43, which is connected to an output terminal 47 through an ideal diode 44, a memory capacitor 45 and a constant current discharge circuit 46, and a vehicle speed Vr is outputted from this output terminal 47. By this system, as shown in FIG. 4, a peak value of the wheel speed Vw in an anti-lock operation is set to a level in the vicinity of the vehicle speed Vv with valleys of the wheel speed Vw connected with a predetermined gradient Gr, to estimate the tentative vehicle speed Vr.

While a vehicle runs on a rough road, the wheel speed Vw pulsates, so that it is judged erroneously that the wheels are about to be locked, to cause the hydraulic braking pressure to decrease unnecessarily, and the braking efficiency to lower. In order to prevent this, the control means 32 has the function of reducing the rate of decrease in the braking pressure when it is judged that the wheels are locked while the vehicle runs on a rough road.

The present inventor has experimentally ascertained that a pulsation frequency f of the wheel speed Vw during a braking operation carried out on a rough road is substantially equal to a natural frequency $n_0$ (generally 15–20 Hz) of a suspension. On the other hand, a fluctuating frequency $n_m$ of the wheel speed Vw during a normal operation of an anti-lock braking system is generally not more than 10 Hz. In the judgement circuit 33, it is judged that, when $f > n_m$, the vehicle is running on a rough road, and a signal E is outputted therefrom.

This signal E is inputted into a delay circuit 49. The terminal, from which the signal $S_1$ is outputted, of the judgement circuit 33, is grounded through a relay switch 50. The delay circuit 49 is adapted to output a signal for turning on a relay switch 50 when a high-level rough road detecting signal E has been inputted thereinto, and keep outputting the same signal for a predetermined period of time, for example, 100 ms after the level of the signal E has become low.

When $Vw < Vr_1$ or $\lambda > \lambda_1$ has been established while the vehicle runs on a rough road, so that the judgement circuit 33 judges that the wheels are about to be locked, to output the high-level signal $S_1$, the level of the signal $S_1$ is rendered low forcibly.

As a result, the rate of decrease in the hydraulic braking pressure during travelling on a rough road decreases. Consequently, the hydraulic braking pressure does not decrease unnecessarily, so that a decrease in the braking efficiency can be prevented.

Figure 5:
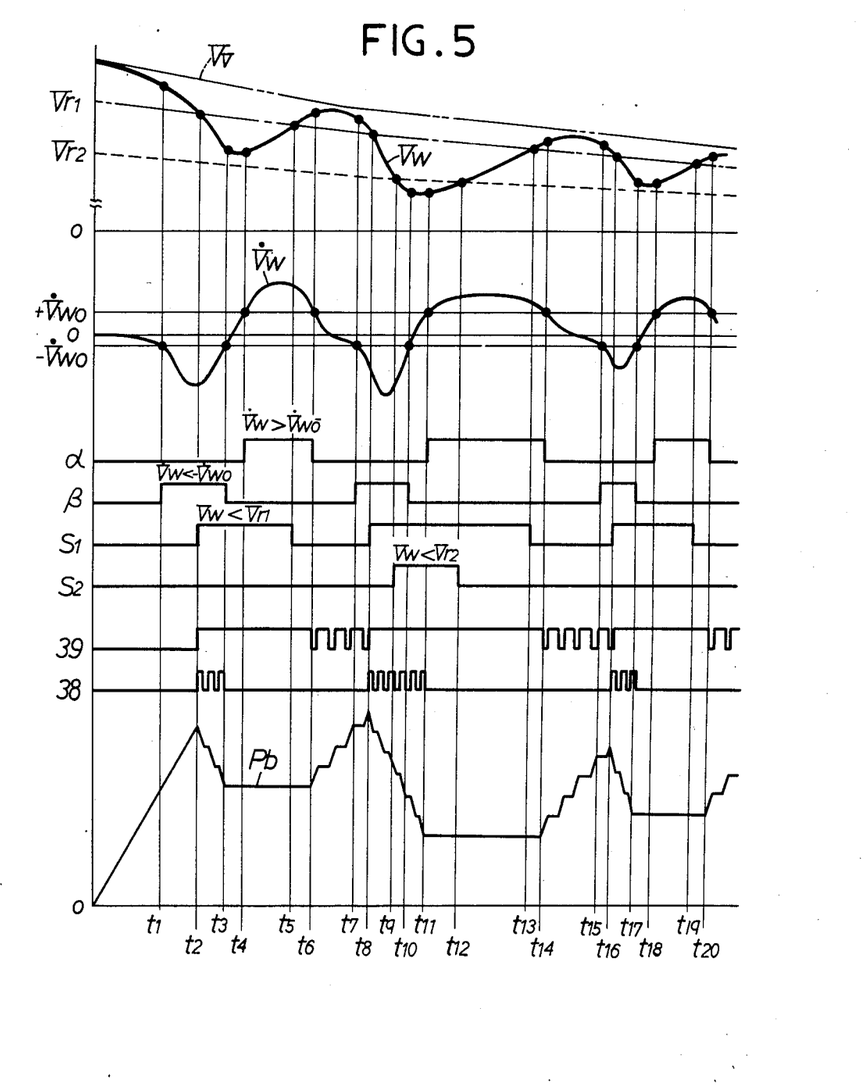
FIG. 5 is a characteristic diagram showing the embodiment in anti-lock operation.

The operation of this embodiment will now be described with reference to FIG. 5. FIG. 5 shows an example of a mode of operation of this anti-lock braking system. The lateral axis of this figure shows the time after the starting of a braking operation, and the vertical axis thereof a vehicle speed Vv, a wheel speed Vw and a first reference wheel speed $Vr_1$ and a second reference wheel speed $Vr_2$ in the uppermost position, a wheel acceleration $\dot{V}w$, a speedup reference value $+\dot{V}w_0$ and a reference wheel deceleration $-\dot{V}w_0$ in the position under the mentioned position, signals $\alpha$, $\beta$, $S_1$, $S_2$ and the operational conditions of the solenoids 38, 39 in the position under the second-mentioned position, and a hydraulic braking pressure Pb in the lowermost position.

Immediately after a braking operation has been started at an instant $t=0$, the levels of the signals $\alpha$, $\beta$, $S_1$, $S_2$ are low. The hydraulic braking pressure Pb increases gradually, and the wheel speed Vw and wheel acceleration $\dot{V}w$ decrease gradually at the same time.

When the wheel acceleration $\dot{V}w$ has become lower than the reference wheel deceleration $-\dot{V}w_0$ ($\dot{V}w < -\dot{V}w_0$) at an instant $t_1$, the level of the signal $\beta$ becomes high but the signal $S_1$ remains to be in a low level since the level of the wheel speed Vw is higher than that of the first reference wheel speed $Vr_1$ at this time. Accordingly, the hydraulic braking pressure Pb continues to increase, and the wheel speed and wheel acceleration $\dot{V}w$ to decrease.

When the wheel speed Vw has become lower than the first reference wheel speed $Vr_1$ at an instant $t_2$, the level of the signal $S_1$ becomes high, and the level of an output from the AND-gate 35 becomes high. Consequently, the levels of outputs from the OR-gates 42, 41 become high. As a result, the solenoids 38, 39 are excited to cause the inlet valve Vil to be opened, and the outlet valve Vol to be closed. The hydraulic braking pressure Pb then starts decreasing, and the wheel acceleration $\dot{V}w$ resumes increasing. During this time, the wheel speed Vw continues to decrease.

When the wheel acceleration $\dot{V}w$ has become higher than the reference wheel deceleration $-\dot{V}w_0$ ($\dot{V}w > -\dot{V}w_0$) at an instant $t_3$, the level of the signal $\beta$ becomes low, and the level of an output from the AND-gate 35 low as well accordingly. Consequently, the solenoid 38 for the inlet valve Vil is deexcited, and the inlet valve Vil is closed. This enables the braking pressure Pb to be maintained in a constant level. Namely, the braking torque is maintained in a substantially constant level. As a result, the wheel speed Vw starts increasing.

When the level of the wheel acceleration $\dot{V}w$ has become higher than the speedup reference level $+\dot{V}w_0$ ($\dot{V}w > +\dot{V}w_0$) at an instant $t_4$, the level of the signal $\alpha$ becomes high. When the wheel speed Vw has exceeded the first reference wheel speed $Vr_1$ at an instant $t_5$, the level of the signal $S_1$ becomes low. When the value of the wheel acceleration $\dot{V}w$ has become smaller than the speedup reference value $+\dot{V}w_0$ at an instant $t_6$, the level of the signal $\alpha$ becomes low, and the outlet valve Vol is opened. This causes the hydraulic braking pressure Pb to increase.

When the wheel acceleration $\dot{V}w$ has become lower than the reference wheel deceleration $-\dot{V}w_0$ ($\dot{V}w < -\dot{V}w_0$) at an instant $t_7$, the level of the signal $\beta$ becomes high. When the wheel speed Vw has become lower than the first reference wheel speed $Vr_1$ ($Vw < Vr_1$) at an instant $t_8$, the level of the signal $S_1$ becomes high. Consequently, the level of an output from the AND-gate 35 becomes high to cause the inlet valve Vil to be closed, and the outlet Vol to be opened, the hydraulic braking pressure Pb beginning to decrease. When the wheel speed Vw has become lower than the second reference wheel speed $Vr_2$ ($Vw < Vr_2$) at an instant $t_9$, so that the possibility that the wheels are locked has become large, the level of the signal $S_2$ becomes high.

When the wheel acceleration $\dot{V}w$ has become higher than the reference wheel deceleration $-\dot{V}w$ at an instant $t_{10}$, the level of the signal $\beta$ becomes low, and the hydraulic braking pressure Pb further decreases, the wheel speed Vw beginning to increase. When the wheel acceleration $\dot{V}w$ has exceeded the speedup reference level $+\dot{V}w_0$ at an instant $t_{11}$, the level of the signal $\alpha$ becomes high, and the level of an output from the AND-gate 40 low. Since the level of an output from the AND-gate 35 is low during this time, the level of an output from the OR-gate 42 is low. Accordingly, excitation is removed from solenoid 38, and the inlet valve Vil is closed. As a result, the hydraulic braking pressure Pb is maintained in a constant level.

When the wheel speed Vw has exceeded the second reference wheel speed $Vr_2$ at an instant $t_{12}$, the level of the signal $S_2$ becomes low. When the wheel speed Vw has exceeded the first reference wheel speed $Vr_1$ at an instant $t_{13}$, the level of the signal $S_1$ becomes low but the hydraulic braking pressure Pb is maintained in a substantially constant level to thereby enable the prevention of the locking of the wheels. When the wheel acceleration $\dot{V}w$ has become lower than the speedup reference level $+\dot{V}w_0$ at an instance $t_{14}$, the level of the signal $\alpha$ becomes low, so that the outlet valve Vol is to be opened. Consequently, the hydraulic braking pressure Pb starts increasing.

When the wheel acceleration $\dot{V}w$ has become lower than the reference wheel deceleration $-\dot{V}w_0$ at an instant $t_{15}$, the level of the signal $\beta$ becomes high. When the wheel speed Vw has become lower than the first reference wheel speed $Vr_1$ at the following instant $t_{16}$, so that the level of the signal $S_1$ becomes high, the inlet valve Vil is opened, and the outlet valve Vol closed.

Consequently, the hydraulic braking pressure Pb starts decreasing. When the wheel acceleration $\dot{V}w$ has exceeded the reference wheel deceleration $-\dot{V}w_0$ at an instant $t_{17}$, the level of the signal $\beta$ becomes low to cause the outlet valve Vol to be opened, so that the hydraulic braking pressure is maintained in a constant level.

When the wheel acceleration $\dot{V}w$ has exceeded the speedup reference level $+\dot{V}w_0$ at an instant $t_{18}$, the level of the signal $\alpha$ becomes high. When the wheel speed Vw has exceeded the first reference wheel speed $Vr_1$ at an instant $t_{19}$, the level of the signal $S_1$ becomes low. When the wheel acceleration $\dot{V}w$ has become lower than the speedup reference level $+\dot{V}w$ at an instant $t_{20}$, the level of the signal $\alpha$ becomes low. As a result, the outlet valve Vol is opened, and the hydraulic braking pressure Pb starts decreasing.

The vehicle speed then decreases with the wheels not locked, as the above-described operations are carried out in the same manner.

In the above embodiment, the level of the signal $S_1$ is decreased to a low level forcibly by the relay switch 50. Only the braking pressure-lessening signal alone may be made ineffective by the signal E alone. The delay circuit 49 may be omitted to drive the relay switch 50 directly by the signal E.

Figure 6:
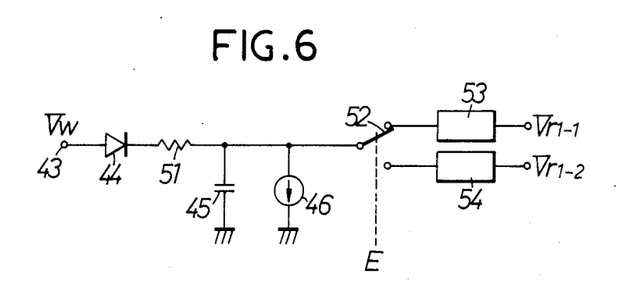
FIG. 6 is a diagram of an electric circuit for use in estimating a vehicle speed in a second embodiment of the present invention.

FIG. 6 shows a second embodiment of the present invention, in which larger and smaller values ($Vr_{1-1} < Vr_{1-2}$) are set as first reference wheel speeds $Vr_{1-1}$, $Vr_{1-2}$. In order to prevent the braking system from being operated erroneously on a rough road during the estimation of the vehicle speed Vr, a charging resistor 51 for a capacitor 45 is inserted between a diode 44 and the capacitor 45, and a constant current discharge circuit 46 is connected to a common contact of a relay switch 52, one independent contact of the relay switch 52 being connected to an arithmetic circuit 53, the other independent contact thereof being connected to an arithmetic circuit 54. One arithmetic circuit 53 is adapted to compute $Vr_{1-1} = Vr \cdot (1 - \lambda_{1-1})$, and the other arithmetic circuit 54 to compute $Vr_{1-2} = Vr \cdot (1 - \lambda_{1-2})$. The reference slip ratios $\lambda_{1-1}$, $\lambda_{1-2}$ is set to $\lambda_{1-1} > \lambda_{1-2}$, and $Vr_{1-1} < Vr_{1-2}$. The relay switch 52 is adapted to be operated by the signal E outputted when a rough road is detected. While the vehicle is running on a rough road, the relay switch 52 is connected to the arithmetic circuit 53 as shown in FIG. 6.

Therefore, when $Vw < Vr_{1-1}$ or $\lambda < \lambda_{1-1}$ during the running on a rough road, the signal $S_1$ is outputted from the judgement circuit 33, and the number of outputting this signal decreases. Accordingly, a rate of decrease in the hydraulic braking pressure is reduced, and a decrease in the braking efficiency can be prevented.

Figure 2:
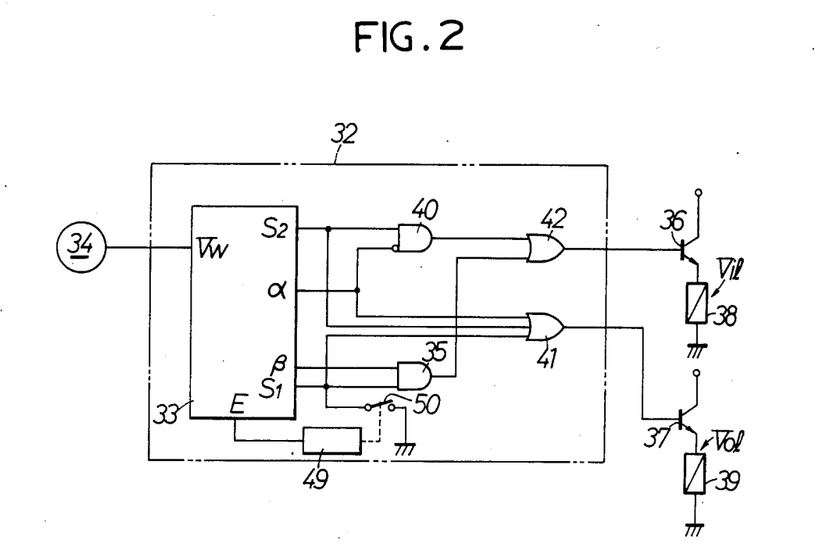
FIG. 2 is a simplified circuit diagram showing the construction of a control means.
Figure 7:
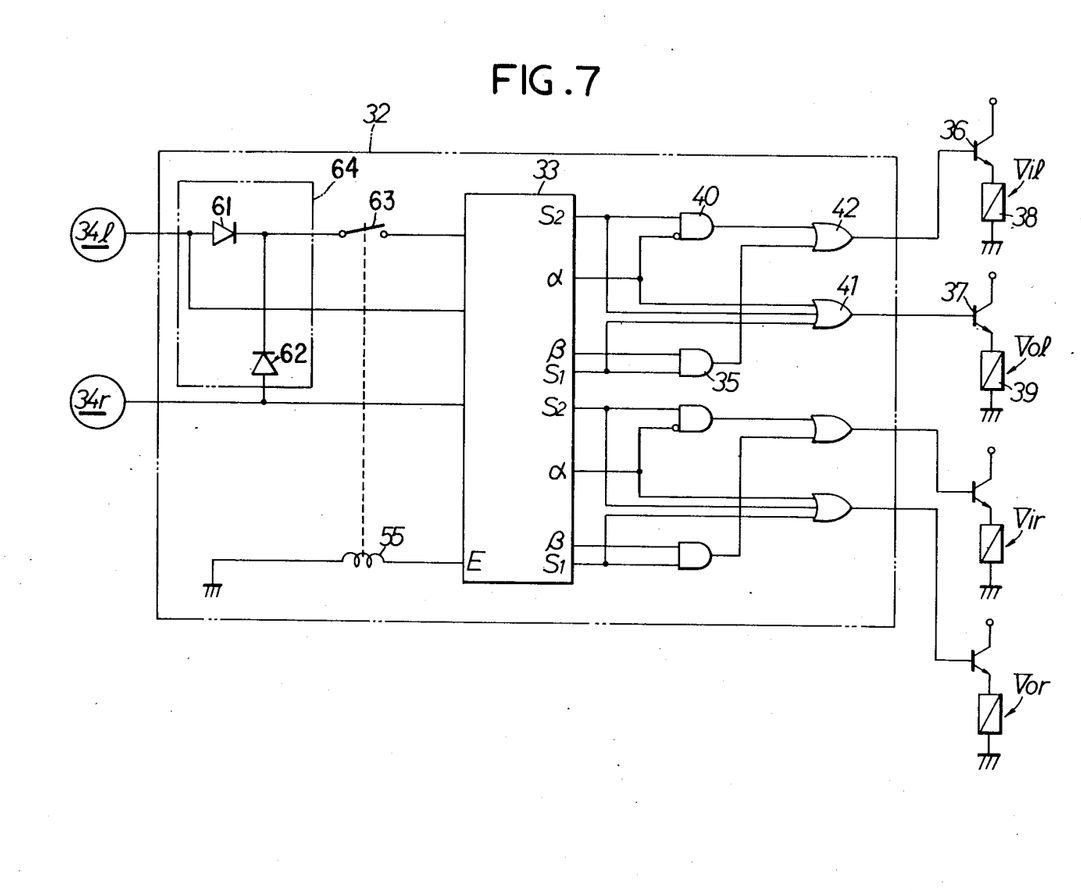
FIG. 7 is a simplified circuit diagram showing the construction of a control means in a third embodiment of the present invention.

FIG. 7 shows a third embodiment of the present invention, and the parts of this embodiment which correspond to those of the embodiment of FIG. 2 are designated by the same reference numerals. Moreover, the construction of the control means for the left and right wheel brakes and that of the control means for the left and right front wheels are completely the same, and, therefore, the embodiment of FIG. 7 will be described with only the parts of, for example, the left and right rear wheel brakes shown by reference numerals.

The left and right wheel detectors 34*l*, 34*r* are connected to one contact of a relay switch 63 through diodes 61, 62 which constitutes a high select circuit 54, and the other contact of this relay switch 63 to a judgement circuit 33. A relay coil 55 for driving the relay switch 63 is provided between an output terminal of the judgement circuit 33, from which a signal E is outputted, and the ground. When the level of the signal E becomes high to cause the relay coil 55 to be turned on, the relay switch 63 is turned on.

While the vehicle runs on a rough road, the relay switch 63 is turned on, and signals from the wheel detectors 34*l*, 34*r* are inputted into the high select circuit 64. As a result, in the high select circuit 64, the highest one of the values of the two wheel speeds is selected, and the selected value is inputted into the judgement circuit 33, in which this selected wheel speed is processed as the actual wheel speed to judge the locking state of the wheels. There is substantially no possibility that the wheels are erroneously judged to be nearly locked when there is no actual possibility of wheel locking, unless the phases of rotation of the left and right wheels or their rotational speeds substantially agree with each other. Accordingly, the rate at which the signal for reducing the hydraulic braking pressure during travelling on a rough road is outputted from the control means 32 decreases, so that an erroneous operation of the braking system can be prevented almost completely.

In this embodiment, the highest wheel speed of the two wheel speeds at each axle is determined as the actual wheel speed at the axle, and a control operation is carried out on the basis thereof. Therefore, while the vehicle runs on a rough road, there is substantially no possibility that the wheels are judged to be locked, unless the phases of the wheels agree with each other. Accordingly, while the vehicle runs on a rough road, the hydraulic braking pressure does not decrease unnecessarily, so that the braking efficiency can be maintained at a high level.

I claim:

1. An anti-locking braking system for a vehicle including a pair of wheels, comprising:

wheel brakes for said respective wheels;

a pair of wheel detectors for detecting rotational speeds of the respective wheels and outputting signals indicative of the wheel speeds;

hydraulic control circuits for controlling the supply of hydraulic braking pressures to the respective wheel brakes for anti-lock operations; and control means for placing said hydraulic control circuits in operative state so as to control the hydraulic braking pressures applied to the wheel brakes, on the basis of the signals from said wheel detectors, when the wheels are about to be locked;

wherein said control means includes a detection means for detecting the condition of a road surface on which the vehicle travels, and when said detection means detects that the vehicle is travelling on a rough road surface, the signals from said wheel detectors are subject to high-selection and only the highest wheel speed value of the two wheel speed signals is employed by said control means for operation of the hydraulic control circuits, whereas when said detection means detects that the vehicle is travelling on a regular road surface, said signals from the respective wheel detectors are employed by said control means for independent operation of their respective hydraulic control circuits.

2. An anti-lock braking system according to claim 1, wherein said detection means judges the vehicle to be travelling on said rough road surface by detecting the fluctuating frequency of a wheel speed being not less than a predetermined level.

3. An anti-lock braking system according to claim 1, wherein when said detection means detects that the vehicle is travelling on said rough road surface, said control means operates to lessen the chance that the wheel brakes are subject to anti-lock operation by the hydraulic control circuits.

* * * * *